United States Patent
Nyberg

(10) Patent No.: US 10,730,599 B2
(45) Date of Patent: Aug. 4, 2020

(54) MARINE VESSEL POWER SYSTEM AND METHOD

(71) Applicant: Caterpillar Propulsion Production AB, Öckerö (SE)

(72) Inventor: Jonas Nyberg, Öckerö (SE)

(73) Assignee: Caterpillar Propulsion Production AB, Ockero (SE)

( * ) Notice: Subject to any disclaimer, the term of this patent is extended or adjusted under 35 U.S.C. 154(b) by 340 days.

(21) Appl. No.: 15/507,391

(22) PCT Filed: Jul. 20, 2015

(86) PCT No.: PCT/EP2015/001489
§ 371 (c)(1),
(2) Date: Feb. 28, 2017

(87) PCT Pub. No.: WO2016/029983
PCT Pub. Date: Mar. 3, 2016

(65) Prior Publication Data
US 2017/0283025 A1    Oct. 5, 2017

(30) Foreign Application Priority Data
Aug. 29, 2014 (EP) .................................. 14182839

(51) Int. Cl.
*F01D 5/18* (2006.01)
*B63H 21/21* (2006.01)
(Continued)

(52) U.S. Cl.
CPC ............. *B63H 21/21* (2013.01); *B63H 3/10* (2013.01); *B63H 2021/216* (2013.01); *F02B 63/04* (2013.01); *Y02T 70/5272* (2013.01)

(58) Field of Classification Search
CPC ............. B63H 3/10; B63H 21/21; B63H 3/00
(Continued)

(56) References Cited

U.S. PATENT DOCUMENTS 5,192,464 A * 3/1993 Pawlowski ........... F24F 5/0035
261/27
6,062,925 A * 5/2000 Salmi ..................... B63B 35/08
114/40
(Continued)

FOREIGN PATENT DOCUMENTS

CN   201916173 U    8/2011
GB     570118 A     6/1945
(Continued)

OTHER PUBLICATIONS

International Search Report for corresponding PCT Application No. PCT/EP2015/001489; report dated Oct. 23, 2015.
(Continued)

Primary Examiner — Long T Tran
Assistant Examiner — James J Kim

(57) ABSTRACT

A power system for a marine vessel comprises an engine and a controllable pitch thruster drivably coupled to the engine. A speed of the controllable pitch thruster various with a speed of the engine. A control unit receives a thrust command value indicating a thrust required from controllable pitch thruster. The control unit determines a current speed of the controllable pitch thruster and calculates a pitch of the controllable pitch thruster that produces thrust in accordance with the thrust command value at the current speed of the controllable pitch thruster. The power system allows for operating the engine at variable speeds to allow for a reduction of the engine speed under partial load conditions.

16 Claims, 3 Drawing Sheets

(51) Int. Cl.
*B63H 3/10* (2006.01)
*F02B 63/04* (2006.01)

(58) Field of Classification Search
USPC .............................................................. 416/1
See application file for complete search history.

(56) References Cited

U.S. PATENT DOCUMENTS

| | | | |
|---|---|---|---|
| 6,261,062 B1* | 7/2001 | Amerling | B63H 3/082 416/147 |
| 6,379,114 B1* | 4/2002 | Schott | B63H 3/10 416/1 |
| 7,473,076 B2* | 1/2009 | Rosenkranz | B63H 3/00 416/1 |
| 7,969,044 B2 | 6/2011 | Armstrong | |
| 8,278,879 B2 | 10/2012 | Kumar | |
| 8,781,694 B1* | 7/2014 | Sheidler | A01D 41/1274 56/11.1 |
| 9,650,120 B2* | 5/2017 | Hartig | B63H 23/24 |
| 2008/0121136 A1* | 5/2008 | Mari | B61C 5/00 105/35 |
| 2008/0315583 A1 | 12/2008 | Beck | |
| 2009/0097959 A1 | 4/2009 | Vos et al. | |
| 2009/0144039 A1* | 6/2009 | Thorsteinsson | G06F 30/20 703/6 |
| 2010/0274420 A1 | 10/2010 | Veit et al. | |
| 2013/0062938 A1 | 3/2013 | Kutmar | |
| 2013/0160722 A1* | 6/2013 | Kyle | B60K 6/26 123/2 |
| 2014/0012440 A1* | 1/2014 | Inoue | B63H 20/007 701/21 |
| 2015/0199471 A1* | 7/2015 | Thorsteinsson | G06F 30/15 703/2 |

FOREIGN PATENT DOCUMENTS

| | | |
|---|---|---|
| JP | 2001 315690 A | 11/2001 |
| JP | 2004 359059 A | 12/2004 |
| KR | 20130012750 A | 2/2013 |
| WO | WO 2010/064483 A1 | 6/2010 |
| WO | WO 2013/020034 A2 | 2/2013 |

OTHER PUBLICATIONS

European Search Report for related Application No. EP 14 182839 dated Feb. 3, 2015.

Räsänen Jan-Erik, "Using Variable Frequency Drives (VFD) To Save Energy and Reduce Emissions in Newbuilds and Existing Ships Energy Efficient Solutions", ABB, Apr. 24, 2012, Power and Productivity for a better world™.

* cited by examiner

MARINE VESSEL POWER SYSTEM AND METHOD

CROSS-REFERENCE TO RELATED APPLICATION

This Application is a 35 USC § 371 US National Stage filing of International Application No. PCT/EP2015/001489 filed on Jul. 20, 2015, which claims priority under the Paris Convention to European Patent Application Serial No. 14182839.2 filed on Aug. 29, 2014.

TECHNICAL FIELD

The present disclosure relates to a power system for a marine vessel, in particular, a power system comprising an engine and one or more controllable pitch thrusters, and a method of operating the same.

BACKGROUND

A marine vessel, such as, for example, an offshore support vessel, includes one or more combustion engines driving one or more main propellers for propulsion of the vessel. The one or more main propellers are mechanically coupled to the one or more engines, for example, via one or more drive shafts. The one or more engines rotate at a given speed, resulting in a corresponding rotation of the one or more main propellers. For example, the vessel may include a pair of diesel engines drivably coupled to a pair of main propellers. The diesel engines and the main propellers are generally operating at constant speed.

For improving the maneuverability of the vessel, so-called tunnel thrusters (also referred to as transverse thrusters) can be provided in a hull structure of the vessel. Particularly, tunnel thruster systems include a passage (tunnel) extending through a hull segment of the hull structure of the vessel, for example, in a transverse direction. A propeller unit of the tunnel thruster system generates a water jet through the passage if activated. That water jet exits the passage in a starboard or port direction of the vessel and thus causes a steering force that allows maneuvering the vessel without travelling forward or aft.

The present disclosure is directed, at least in part, to improving or overcoming one or more aspects of prior systems.

SUMMARY OF THE DISCLOSURE

In one aspect of the present disclosure, a marine vessel power system comprises an engine configured to operate at varying engine speeds, a controllable pitch thruster drivably coupled to the engine, and a control unit. The control unit is configured to receive a thrust command value, determine a current speed of the controllable pitch thruster, and calculate a pitch of the controllable pitch thruster to produce thrust in accordance with the thrust command value based on the current speed of the controllable pitch thruster.

In another aspect of the present disclosure, a method of operating a marine vessel power system comprising an engine configured to operate at varying speeds and a controllable pitch thruster drivably coupled to the engine comprises receiving a thrust command value, determining a current speed of the controllable pitch thruster, and calculating a pitch of the controllable pitch thruster to produce thrust in accordance with the thrust command value based on the current speed of the controllable pitch thruster.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

Figure 1:
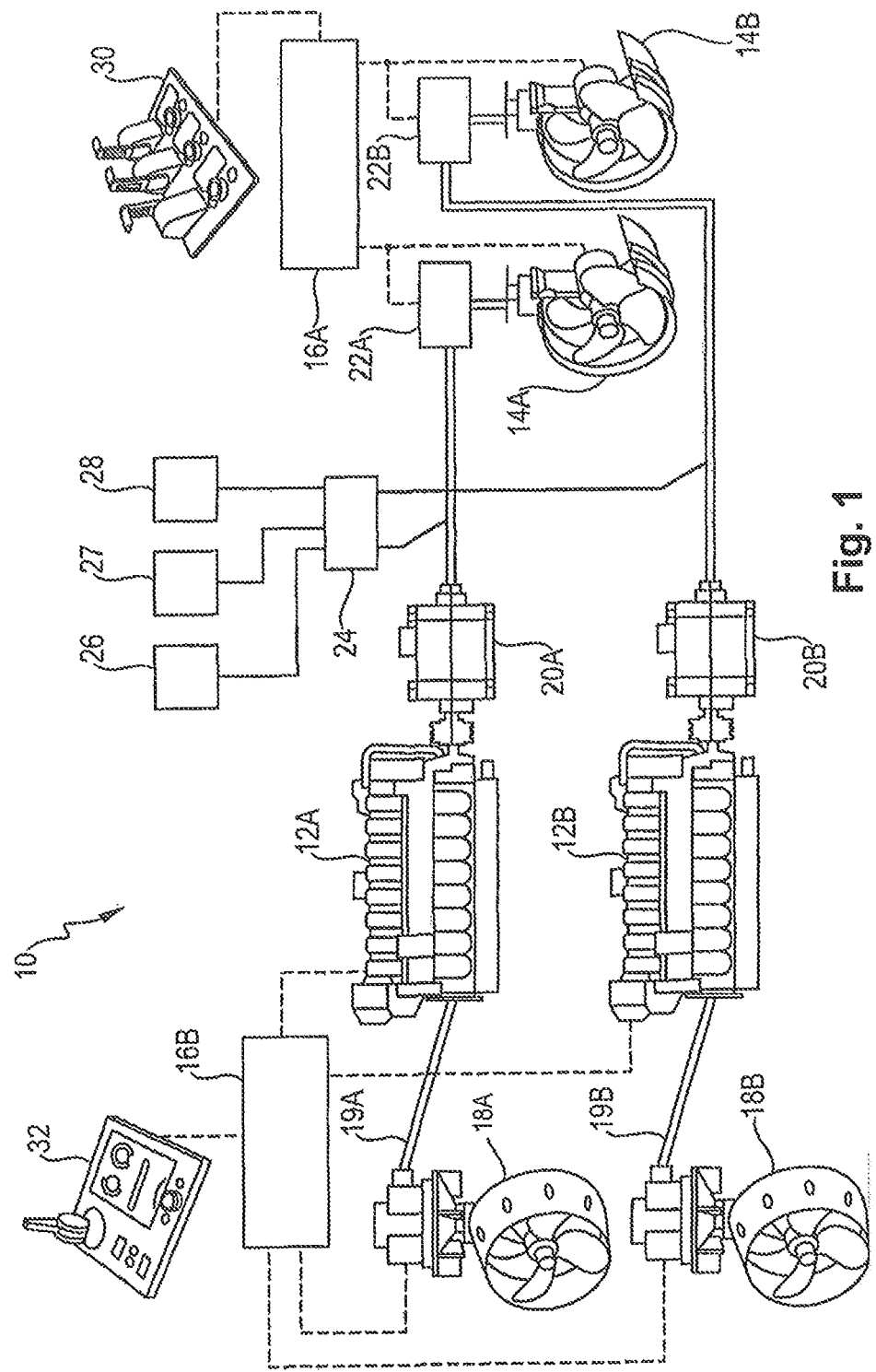
FIG. 1 shows a schematic overview of a marine vessel power system.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in parts on the realization that in certain conventional designs including engines and main propellers running at constant speed, inefficiencies may occur when the engines are running on low loads. When this is the case, the main propellers are rotating with a low pitch, which is a condition that is far away from the design condition of the propellers. If the systems could be run at variable speed, this would increase the efficiency for both the engines and the propellers. However, if the engine also drives a shaft alternator providing power to tunnel thrusters and ship systems, the frequency of the AC power generated by the shaft alternator would then also vary, requiring the loads being supplied with the AC power to be able to handle this variable frequency.

In typical offshores support vessels, the biggest electrical loads are the tunnel thrusters used while in dynamic positioning mode. According to the present disclosure, if the tunnel thrusters have a controllable pitch propeller, the thrust at varying speeds of the tunnel thrusters can be controlled by controlling the pitch of the same in an appropriate manner. This allows the entire power system from engine to main propeller to tunnel thruster to operate at variable speed as a single system. The speed may depend on the overall power requirements and, for example, weather conditions or the like.

The present disclosure may further be based in part on the realization that decreasing the engine speed if the engine load is relatively low may reduce fuel consumption under partial load conditions, reduce wear of the engines and the propulsion system, and may also reduce noise and vibrations. The lower engine speed can be compensated for by adjusting the pitch of the tunnel thrusters and the main propellers in an appropriate manner.

In the following, an exemplary marine vessel power system is described with reference to FIG. 1.

FIG. 1 schematically shows a power system 10 for a marine vessel according to an exemplary embodiment. Power system 10 includes a pair of engines 12A, 12B. Each of engines 12A, 12B may be an internal combustion engine configured to burn a supply of gaseous and/or liquid fuel to produce a mechanical output. For example, each engine 12A, 12B may be a diesel engine, a gaseous fuel engine or a dual fuel engine configured to burn both gaseous fuel and liquid fuel, for example, diesel oil. Each of engines 12A, 12B may be a variable speed engine that is configured to rotate at varying speeds.

Power system 10 further includes a pair of main propellers 18A, 18B mechanically connected to the pair of engines 12A, 12B via corresponding drive shafts 19A, 19B and, for example, a gear mechanism (not shown). Each main propeller 18A, 18B may, for example, be configured as a controllable pitch azimuth thruster. The pitch angle of the blades of each propeller may be adjusted, for example, using a hydraulic system including a pitch control valve 36 (see FIG. 3), which will be described in more detail below. Drive shafts 19A, 19B transmit the rotation of engines 12A, 12B to main propellers 18A, 18B such that main propellers 18A, 18B rotate at a speed that is proportional to the speed of engines 12A, 12B. The thrust provided by main propellers 18A, 18B may be adjusted by adjusting the pitch angle of the blades of the propellers. In the following, this will simply be referred to as "adjusting the pitch of the main propellers" or, in case of the tunnel thrusters described below, "adjusting the pitch of the tunnel thrusters".

The desired thrust from main propellers 18A, 18B is set, for example, by an operator input device 32. Operator input device 32 may include a lever, joystick, etc. configured to be operated by an operator. An operation amount of operator input device 32 is converted into a thrust command value and transmitted to a control unit 16B. It will be readily appreciated, however, that in other embodiments the thrust command value may be generated by a dynamic positioning system or a similar control system of the vessel. Control unit 16B is operatively connected to engines 12A, 12B and main propellers 18A, 18B, as shown by dashed lines in FIG. 1. It will be appreciated that in other embodiments control unit 16B may only be connected to one of engines 12A, 12B and a corresponding one of main propellers 18A, 18B. In other words, a separate control unit may be provided for each engine/shaft line.

Power system 10 further includes a pair of alternators (i.e, generators) 20A, 20B mechanically connected to the pair of engines 12A, 12B. For example, an input of alternator 20A may be mechanically connected to a flywheel of engine 12A, and an input of alternator 20B may be mechanically connected to a flywheel of engine 12B. Each of alternators 20A, 20B is configured to receive the mechanical output from the associated engine 12A, 12B and convert the same to electrical AC power. The AC power generated by each of alternators 20A, 20B is provided to an electric motor 23 (see FIG. 2) associated with one of the pair of tunnel thrusters 14A, 14B. For example, tunnel thrusters 14A, 14B may be provided at a bow of the vessel and may generate a water jet resulting in a steering force which facilitates steering of the vessel.

In order to activate tunnel thrusters 14A, 14B, a pair of starters 22A, 22B is connected between alternators 20A, 20B and the electrical motors of tunnel thrusters 14A, 14B. As shown in FIG. 1, starters 22A, 22B are operatively connected with a control unit 16A. Control unit 16A is configured to send a start command to starters 22A, 22B to start the electric motors of tunnel thrusters 14A, 14B to rotate the propellers of tunnel thrusters 14A, 14B with a speed that is determined by the speed of the associated electric motor. The speed of the associated electric motor is determined by the frequency of the AC power supplied to the electric motors from alternators 20A, 20B. Here, the frequency of the AC power supplied by the alternators 20A, 20B is proportional to the speed of engines 12A, 12B. Accordingly, as the speed of engines 12A, 12B decreases, the frequency of the AC power supplied to the electric motors also decreases, resulting in a decreased speed of the tunnel thrusters 14A, 14B, i.e., a decreased speed of rotation of the propellers of the same.

Control unit 16A is further operatively connected to an operator input device 30. Operator input device 30 may include a plurality of input devices such as levers, joysticks or the like for individually adjusting the thrust provided by each of tunnel thrusters 14A, 14B. In particular, operator input device 30 is configured to start and stop tunnel thrusters 14A, 14B as required. It will again be appreciated that tunnel thrusters may also be automatically controlled using a dynamic positioning system of the vessel.

Although two control units 16A, 16B are shown in FIG. 1, it will be readily appreciated that control units 16A, 16B may be incorporated in a single control unit 16 (see, for example, FIGS. 2 and 3) or control system for controlling all components of power system 10, in particular, engines 12A, 12B, main propellers 18A, 18B and tunnel thrusters 14A, 14B.

Power system 10 further includes an optional frequency controller 24 configured to receive AC power output by alternators 20A and/or 20B. Frequency controller 24 is configured to convert the AC power having a variable frequency in accordance with the speed of engines 12A, 12B to supply the same to one or more electrical loads 26, 27, 28 which may require fixed frequencies. For example, electrical loads 26, 27, 28 may be heating systems, pumps, navigation and bridge systems and other auxiliary systems onboard the vessel.

Figure 2:
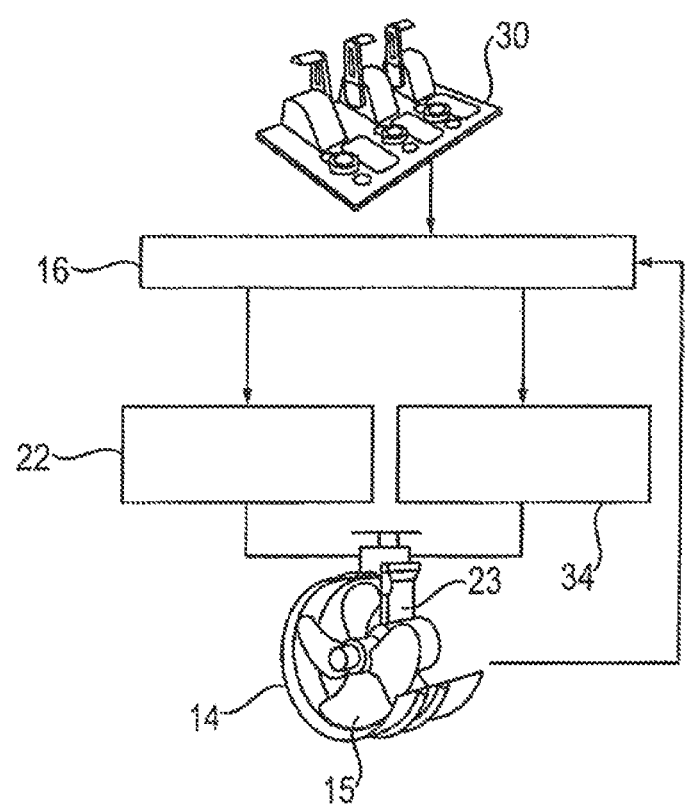
FIG. 2 schematically illustrates a control process for a controllable pitch thruster of the system shown in FIG. 1.
Figure 3:
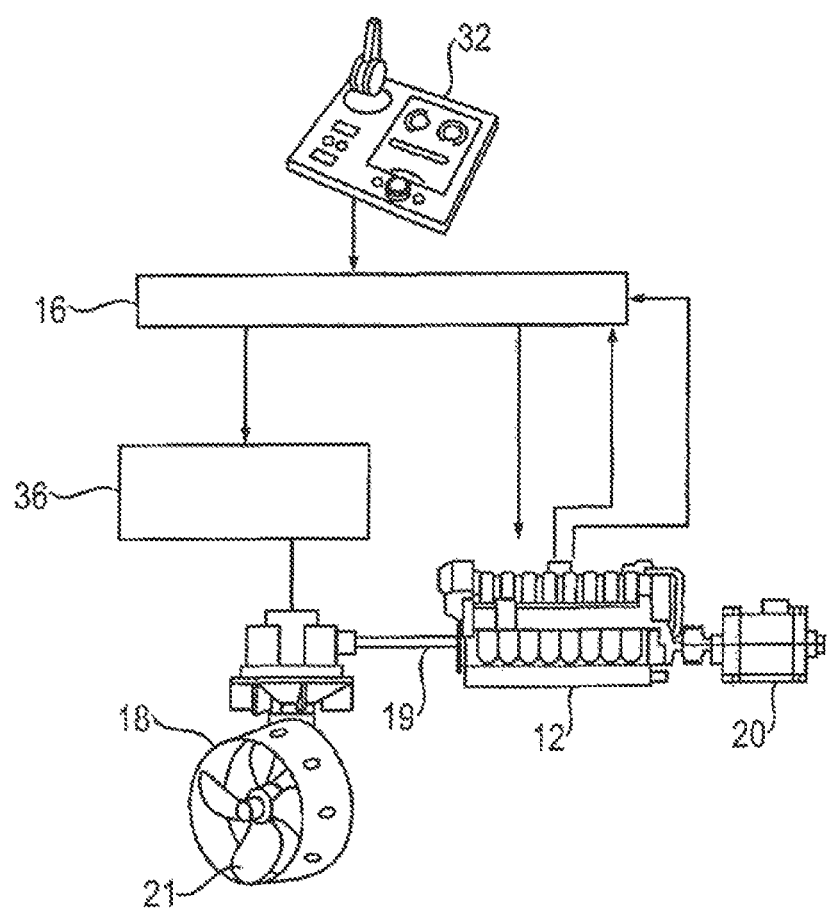
FIG. 3 schematically illustrates a control process for a controllable pitch main propeller of the power system shown in FIG. 1.

FIGS. 2 and 3 schematically illustrate control processes performed in the power system of FIG. 1. FIG. 2 shows a control process for an exemplary thruster 14, while FIG. 3 shows a control process for an exemplary main propeller 18. It will be readily appreciated that, although processes for a single thruster 14 and a single main propeller 18 are described with reference to FIGS. 2 and 3, the description applies to both main propellers 18A, 18B shown in FIG. 1 and to both tunnel thrusters 14A, 14B shown in FIG. 1. Further, it is obvious that in other embodiments more than two main propellers and/or tunnel thrusters may be provided and may be controlled in the described manner. Further, thruster 14 is not limited to a tunnel thruster and may be a any other thruster that is powered by an alternator connected to an engine in the described manner.

As shown in FIG. 2, control unit 16 is configured to receive an input from operator input device 30. The input received from operator input device 30 indicates the required thrust from thruster 14. As previously described, thruster 14 includes a propeller 15 driven to rotate by electric motor 23. Thruster 14 is a controllable pitch thruster, i.e., the pitch angle of the blades of propeller 15 may be adjusted. In particular, a hydraulic system including a pitch control valve 34 may be provided to adjust the pitch of thruster 14.

Electric motor 23 receives AC power from an alternator 20 (see FIG. 3) driven by an engine 12. Again, it will be readily appreciated the description applies to both engines 12A, 12B and alternators 20A, 20B shown in FIG. 1, and that more than two engines/alternators may be provided in other embodiments. The speed of rotation of electric motor 23 and propeller 15, i.e., the speed of thruster 14, is determined by the frequency of the AC power supplied by alternator 20. This frequency in turn depends on the speed of engine 12.

Control unit 16 is configured to receive a current speed of thruster 14 as an input. The current speed of thruster 14 may be determined using, for example, a speed sensor disposed adjacent to a shaft of thruster 14, in electric motor 23 or at another component of thruster 14 from which the speed can be derived. Alternatively, the speed of thruster 14 may be derived by control unit 16 on the basis of the frequency of the AC power supplied to electric motor 23 and/or other parameters. Further, control unit 16 is configured to output a start/stop command to a starter 22 associated with thruster 14, and to output a pitch setting for thruster 14 to pitch control valve 34.

When thruster 14 is activated, the frequency of the AC power supplied to electric motor 23 determines the speed of electric motor 23 and thruster 14. Accordingly, control unit 16 is configured to receive the input indicating the current speed of thruster 14, and to calculate the pitch of thruster 14 that is needed to achieve thrust in accordance with a thrust command value received from operator input device 30. For example, one or more maps may be stored in a memory that is accessible by control unit 16. The one or more maps may relate the received thrust command value, the speed of thruster 14 and the required pitch and may be used by the control unit 16 to calculate the pitch. The pitch can also be calculated based on one or more mathematical relationships between these parameters. Using the calculated pitch, control unit 16 commands pitch control valve 34 to adjust the pitch of thruster 14 such that thrust in accordance with the thrust command value is obtained. In this manner, the required thrust can be obtained at variable speeds of thruster 14.

It will be readily appreciated that the hydraulic system including pitch control valve 34 is only an example for a device for adjusting the pitch of thruster 14, and that any appropriate configuration can be used to adjust the same. For example, electric and/or magnetic actuators may be used to adjust the pitch of thruster 14.

Referring now to FIG. 3, a control process for an exemplary main propeller 18 is illustrated.

As shown in FIG. 3, control unit 16 is configured to receive an input from operator input device 30 indicating a thrust required from main propeller 18. Further, control unit 16 is configured to transmit a speed command value to engine 12 indicating the speed at which engine 12 should operate. In addition, control unit 16 is configured to receive as an input the actual speed of engine 12. The actual speed of engine 12 may be determined using a speed sensor associated with, for example, a crank shaft or another component of engine 12. Control unit 16 is further configured to receive an engine load which indicates the total load on engine 12 due to main propeller 18 and alternator 20.

Further, control unit 16 is configured to transmit a pitch command value to a pitch control valve 36 associated with main propeller 18. The pitch command value output by control unit 16 determines the pitch of main propeller 18, i.e., the pitch of the blades of a propeller unit 21 of main propeller 18.

Control unit 16 is configured to calculate the required pitch for main propeller 18 on the basis of the current engine speed of engine 12 and the thrust command value received from operator input device 32.

In addition, control unit 16 is configured to determine an engine load at the current engine speed, for example, by receiving an engine load signal from engine 12, and vary the current engine speed depending on the engine load. In particular, control unit 16 may be configured to decrease the engine speed when the engine load is below a lower threshold, for example, 20% of maximum load at the current engine speed.

Likewise, control unit 16 may be configured to increase the engine speed when the engine load is above an upper threshold, for example, 90% of the maximum engine load at the current speed.

In both cases, control unit 16 may be configured to vary the engine speed in a stepwise manner, for example, in accordance with a plurality of predetermined speed settings for engine 12. In addition or as an alternative, control unit 16 may be configured to continuously vary the engine speed based on the engine load.

It will be readily appreciated that, although a pair of engines 12A, 12B with associated pairs of main propellers 18A, 18B and tunnel thrusters 14A, 14B is shown in FIG. 1, in other exemplary embodiments, only a single engine 12 with a single main propeller 18 may be provided. In the same manner, in other exemplary embodiments, more than two engines and more than two main propellers and/or tunnel thrusters may be provided.

INDUSTRIAL APPLICABILITY

The marine vessel power system disclosed herein is applicable in marine vessels for improving the efficiency of the system. In particular, the power system disclosed herein may result in a reduced fuel consumption under partial load conditions, reduce wear of the propulsion system and the engine system, and reduce noise and vibrations due to lower system speeds under partial load conditions.

An exemplary operation of the disclosed power system 10 will be described in the following with reference to FIGS. 2 and 3.

Under normal load conditions, power system 10 may be operating with the default speed setting for engine 12. Accordingly, control unit 16 sets a speed command value to a default speed value and transmits the same to engine 12 such that engine 12 is operating at the default speed. Engine 12 drives alternator 20 to convert the mechanical output by engine 12 to AC power having a frequency corresponding to the default speed. For example, alternator 20 may be configured such that, when engine 12 is operating at the default speed, the AC power output by alternator 20 has a frequency of 60 Hz. The AC power with the frequency of 60 Hz is supplied to electric motor 23 of thruster 14 to rotate thruster 14 at a speed that is determined by the frequency of 60 Hz and the configuration of electric motor 23. When operator input device 30 is operated to activate thruster 14, control unit 16 generates a thrust command value on the basis of the current speed of thruster 14, which current speed corresponds to the default engine speed and the frequency of 60 Hz supplied by alternator 20.

At the same time, engine 12 operating at the default speed drives main propeller 18 via drive shaft 19 to rotate at a speed that is proportional to the speed of engine 12, and control unit 16 sets a pitch of main propeller 18 in accordance with a thrust command value obtained from operator input device 32, using the default speed obtained from engine 12 as a basis for calculating the pitch of main propeller 18.

Control unit 16 monitors the engine load of engine 12. When it is determined that, for example, the engine load is below a lower threshold, for example, 20% of the maximum engine load at the current speed, for example, the default speed, control unit sends a speed command value to engine 12 to reduce the speed of engine 12. The reduction in the speed of engine 12 may be done in a stepwise manner for example, using a plurality of predetermined speed settings. Alternatively or additionally, control unit 16 may be configured to continuously decrease the speed of engine 12 based on a difference between the engine load and the lower threshold.

In response to the speed command value received from control unit 16, the speed of engine 12 is reduced. Consequently, alternator 20 is driven at a lower speed, such that the frequency of the AC power output by alternator 20 will decrease, for example, proportionally to the decrease in the speed of engine 12.

As a result, the speed of thruster 14 will also decrease. Control unit 16 monitors the speed of thruster 14 and calculates an appropriate pitch command value for pitch control valve 34 on the basis of the current speed of thruster 14 and the thrust command value obtained from operator input device 30. Therefore, the desired thrust indicated by the thrust command value is produced at the reduced speed of thruster 14.

In the same manner, control unit 16 is configured to set the pitch of main propeller 18 on the basis of the reduced engine speed of engine 12 and the thrust command value from operator input device 32. Accordingly, the desired thrust for propelling the vessel is obtained at a lower speed of engine 12 by increasing the pitch of main propeller 18 as necessary.

Accordingly, with the above control system and method, the speed of engine 12, main propeller 18 and tunnel thruster 14 can be reduced as one to increase the efficiency for both engine 12 and main propeller 18, while taking into account the reduced speed of thruster 14 due to the lowered frequency output by alternator 20.

In case the engine load increases, for example, to about 90% of the maximum engine load at the current speed, control unit 16 sends a speed command value to engine 12 to increase the engine speed. Accordingly, a frequency of the AC power output by alternator 20 will also increase, thereby increasing the speed of thruster 14. In the same manner, the speed of main propeller 18 will also increase. Control unit 16 will then use the current speeds of thruster 14 and main propeller 18 to calculate new pitch command values for thruster 14 and main propeller 18 in accordance with the corresponding thrust command values output by operator input devices 30 and 32, respectively. As in the case of a reduction in speed, control unit 16 may be configured to increase the speed of engine 12 in a stepwise manner and/or continuously.

Power system 10 may be configured such that the variation in speed is limited to a particular range, for example, such that the frequency of the AC power output by alternator 20 is within a predetermined range, for example, between 30 and 60 Hz or between 50 and 60 Hz. It will be readily appreciated, however, that different values or intervals could be used, depending on the configuration of the individual components of power system 10, for example, engine 12, alternator 20, main propeller 18 and the like.

Although the preferred embodiments of this invention have been described herein, improvements and modifications may be incorporated without departing from the scope of the following claims.

The invention claimed is:

1. A marine vessel power system comprising:
   an engine configured to operate at varying engine speeds;
   a controllable pitch thruster operatively coupled to the engine, the controllable pitch thruster including an electric motor;
   a pitch control valve coupled to the electric motor of the controllable pitch thruster; and
   a control unit configured to:
      receive a thrust command value;
      determine a current speed of the controllable pitch thruster based on a frequency of power supplied to the electric motor;
      calculate a pitch of the controllable pitch thruster to produce thrust in accordance with the thrust command value based on the current speed of the controllable pitch thruster; and
      command the pitch control valve to adjust the controllable pitch thruster to the calculated pitch.

2. The marine vessel power system of claim 1, wherein the control unit is further configured to:
   determine a current engine speed of the engine;
   determine an engine load at the current engine speed; and
   vary the current engine speed depending on the engine load.

3. The marine vessel power system of claim 2, wherein the control unit is configured to decrease the engine speed when the engine load is below a lower threshold.

4. The marine vessel power system of claim 2, wherein the control unit is configured to increase the engine speed when the engine load is above an upper threshold.

5. The marine vessel power system of claim 2, wherein the control unit is configured to vary the engine speed in a stepwise manner.

6. The marine vessel power system of claim 2, wherein the control unit is configured to vary the engine speed in accordance with a plurality of predetermined speed settings for the engine.

7. The marine vessel power system of claim 2, wherein the control unit is configured to continuously vary the engine speed based on the engine load.

8. The marine vessel power system of claim 2, further comprising:
   a controllable pitch main propeller driveably coupled to the engine,
   wherein the control unit is further configured to:
      receive a thrust demand for the controllable pitch main propeller; and
      calculate a pitch command for the controllable pitch main propeller on the basis of the thrust demand and the current engine speed of the engine.

9. The marine vessel power system of claim 1, further comprising:
   an alternator configured to be driven by the engine to supply AC power, the frequency of the AC power varying with the speed of the engine, the electric motor of the controllable pitch thruster configured to drive the controllable pitch thruster using the AC power supplied by the alternator.

10. The marine vessel power system of claim 9, further comprising a frequency controller connected to the alternator and configured to convert the AC power supplied by the alternator and supply the converted AC power to one or more electrical loads.

11. The marine vessel power system of claim 1, wherein the pitch control valve is operatively coupled to the control unit.

12. The marine vessel power system of claim 1, further comprising an operator input device configured to receive an operator input and to output the thrust command value in accordance with the received operator input.

13. The marine vessel power system of claim 1, comprising:
a plurality of engines; and
a plurality of controllable pitch thrusters, each of the plurality of controllable pitch thrusters driveably coupled to a corresponding one of the plurality of engines,
wherein the control unit is configured to:
determine a current speed of each of the plurality of controllable pitch thrusters; and
calculate a pitch of each of the plurality of controllable pitch thrusters to produce thrust in accordance with the thrust command value.

14. A method of operating a marine vessel power system comprising an engine configured to operate at varying speeds and a controllable pitch thruster operatively coupled to the engine, the controllable pitch thruster including an electric motor, the method comprising:
receiving a thrust command value;
determining a current speed of the controllable pitch thruster based on a frequency of power supplied to the electric motor;
calculating a pitch of the controllable pitch thruster to produce thrust in accordance with the thrust command value based on the current speed of the blades of the controllable pitch thruster; and
commanding a pitch control valve coupled to the electric motor of the controllable pitch thruster to adjust the controllable pitch thruster to the calculated pitch.

15. The method of claim 14, further comprising:
determining a current engine speed of the engine;
determining an engine load at the current engine speed; and
varying the engine speed depending on the engine load.

16. The method of claim 14, wherein the marine vessel power system further comprises a controllable pitch main propeller driveably coupled to the engine, the method further comprising:
receiving a thrust demand for the controllable pitch main propeller; and
calculating a pitch command for the controllable pitch main propeller on the basis of the thrust demand and the current engine speed of the engine.

* * * * *